United States Patent [19]

Bartlett et al.

[11] Patent Number: 4,954,289

[45] Date of Patent: Sep. 4, 1990

[54] AZEOTROPES OF HYDROGEN-CONTAINING HALOCARBONS WITH BUTANES

[75] Inventors: Philip L. Bartlett; Joseph A. Creazzo, both of Wilmington; Robert A. Gorski, Newark, all of Del.

[73] Assignee: E. I. du Pont de Nemours and Company, Wilmington, Del.

[21] Appl. No.: 366,370

[22] Filed: Jun. 12, 1989

[51] Int. Cl.$^5$ .............................. C09K 3/00; C09K 3/30
[52] U.S. Cl. ...................................... 252/305; 134/12; 134/38; 134/39; 134/40; 203/67; 252/162; 252/172; 252/350; 252/364; 521/98; 521/131; 521/143; 521/146; 521/79; 521/910
[58] Field of Search ............... 252/305, 162, 172, 350, 252/364, DIG. 9; 521/98, 131, 79, 143, 146, 910

[56] References Cited

U.S. PATENT DOCUMENTS

| | | | |
|---|---|---|---|
| 2,999,815 | 9/1961 | Eiseman, Jr. | 252/171 |
| 2,999,816 | 9/1961 | Bennett et al. | 252/171 |
| 2,999,817 | 9/1961 | Bower | 252/172 |
| 3,881,949 | 5/1975 | Brock | 134/31 |
| 3,903,009 | 9/1975 | Bauer et al. | 252/171 |
| 4,055,521 | 10/1977 | Taub | 252/DIG. 9 |
| 4,144,187 | 3/1979 | Hutchinson | 252/DIG. 9 |
| 4,155,865 | 5/1979 | Ostrozynski et al. | 252/DIG. 9 |
| 4,157,310 | 6/1979 | Hutchinson | 252/DIG. 9 |
| 4,767,561 | 8/1988 | Gorski | 252/171 |

*Primary Examiner*—Morton Foelak

[57] ABSTRACT

Azeotropes of 1-chloro-1,2,2,2-tetrafluoroethane or 1-chloro-1,1-difluoroethane with n-butane or isobutane and their use as propellants and foam blowing agents.

10 Claims, No Drawings

AZEOTROPES OF HYDROGEN-CONTAINING HALOCARBONS WITH BUTANES

FIELD OF THE INVENTION

This invention relates to azeotropes of 1-chloro-1,2,2,2-tetrafluoroethane (HCFC-124) and 1-chloro-1,1-difluoroethane (HCFC-142b) with n-butane and isobutane and their use as aerosol propellants and blowing agents for polymer foams.

BACKGROUND OF THE INVENTION

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with chlorotrifluoromethane as the primary blowing agent.

A second important type of insulating foam is phenolic foam. These foams, which have very attractive flammability characteristics, are generally made with chlorotrifluoromethane and 1,1,2-trichloro-1,2,2-trifluoroethane (CFC-113) blowing agents.

A third type of insulating foam is thermoplastic foam, primarily polystyrene foam. Polyolefin foams (polyethylene and polypropylene) are widely used in packaging. These thermoplastic foams are generally made with dichlorodifluoromethane as blowing agent.

Many products designed for household, personal or industrial use are available as aerosol products. Typical examples of such products and ones in which the propellant system of the present invention can be used include personal products such as hair sprays, deodorants and colognes; household products such as waxes, polishes, pan sprays, room fresheners and household insecticides; industrial products such as cleaners, lubricants, and mold release agents; and automotive products such as cleaners and polishes. All such products utilize the pressure of a propellant gas or a mixture of propellant gases (i.e., a propellant gas system) to expel the active ingredients from the container. For this purpose, most aerosols employ liquified gases which vaporize and provide the pressure to propel the active ingredients when the valve on the aerosol container is pressed open.

An important physical property associated with the dispensing of aerosol products is the vapor pressure of the propellant. Vapor pressure from the viewpoint of this invention is the pressure exerted when a liquified propellant gas is in equilibrium with its vapor in a closed container, such as an aerosol can. Vapor pressure can be measured by connecting a pressure gauge to the valve on an aerosol can or gas cylinder containing the vapor/liquid mixture. A standard of measurement of vapor pressure in the U.S. aerosol industry is pounds per square inch gauge (psig) with the gas/liquid mixture at constant temperature, most commonly at 70° F. (21° C.). The vapor pressures of liquified gases most widely employed as aerosol propellants will vary over the range of about 20 to 90 psig (138 to 620 kPag) at 70° F. (21° C.). The propellant systems of the present invention have vapor pressures in this latter range.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of the 1978-1987, much research was conducted to study the ozone depletion theory. Because of the complexity of atmospheric chemistry, many questions relating to this theory remained unanswered. However, assuming the theory to be valid, the health risks which would result from depletion of the ozone layer are significant. This, coupled with the fact that world-wide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified January 1, 1989 and becomes effective on July 1, 1989.

Because of this proposed reduction in availability of fully halogenated chlorofluorocarbons such as chlorotrifluoromethane, dichlorodifluoromethane, and 1,1,2-trichloro-1,2,2-trifluoroethane alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The accompanying Table lists the ozone depletion potential for a variety of fully and partially halogenated halocarbons. Greenhouse potential data (potential for reflecting infrared radiation (heat) back to earth and thereby raising the earth's surface temperature) are also shown.

TABLE I

| OZONE DEPLETION AND GREENHOUSE POTENTIALS | | |
|---|---|---|
| Blowing Agent | Ozone Depletion Potential | Greenhouse Potential |
| ($CFCl_3$) | 1.0 | 0.4 |
| ($CF_2Cl_2$) | 1.0 | 1.0 |
| ($CHF_2Cl$) | 0.05 | 0.07 |
| ($CF_3CHCl_2$) | 0.02 | less than 0.1 |
| ($CF_3CHFCl$) | 0.02 | less than 0.1 |
| ($CF_3CH_2F$) | 0 | less than 0.1 |
| ($CFCl_2CH_3$) | 0.1 | less than 0.1 |
| ($CF_2ClCH_3$) | 0.06 | less than 0.2 |
| ($CHF_2CH_3$) | 0 | less than 0.1 |
| ($CF_2Cl$-$CFCl_2$) | 0.8 | 0.3–0.8 |

Halocarbons such as $CF_3CHFCl$ and $CF_2ClCH_3$ are environmentally acceptable in that they theoretically have minimal effect on ozone depletion.

Although 1-chloro-1,2,2,2-tetrafluoroethane and 1-chloro-1,1-difluoroethane have utility as aerosol propellants and foam blowing agents, azeotropes offer more economical systems with improved properties as non-fractionating aerosol propellants and blowing agents, while maintaining low ozone depletion potential.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

According to the present invention, azeotropes of 1-chloro-1,2,2,2-tetrafluoroethane (HCFC-124) and 1-chloro-1,1-difluoroethane (HCFC-142b) with n-butane or isobutane have been discovered.

Also included in the invention are processes for using these azeotropes as aerosol propellants and foam blowing agents.

All of the azeotropes of the present invention are minimum boiling azeotropes. Thus the boiling points of these azeotropes are lower than the boiling points of the azeotrope components. Since the boiling points of the azeotropes are lower than those for the components, the vapor pressures for the azeotropes at a particular temperature are higher than the individual component vapor pressures at that temperature.

DETAILED DESCRIPTION OF THE INVENTION

The azeotropes of the invention have the compositions as defined in the following table:

TABLE II

| AZEOTROPIC COMPOSITIONS | | |
|---|---|---|
| Components | Compositions | Vapor Pressures at 15° C. |
| HCFC-124/n-butane | 86.4/13.6 (± 1.8 wt. %) | 42.5 psia (293 kPaa) |
| HCFC-124/isobutane | 72.5/27.5 (± 4.0 wt. %) | 47.7 psia (329 kPaa) |
| HCFC-142b/n-butane | 78.9/21.1 (± 4.3 wt. %) | 37.5 psia (259 kPaa) |
| HCFC-142b/isobutane | 60.5/39.5 (± 1.9 wt. %) | 43.1 psia (297 kPaa) |

The azeotropes of HCFC-124 and HCFC-142b are useful as aerosol propellants and as blowing agents for thermoset foams (polyurethane and phenolic) and thermoplastic foams (polystyrene, polyethylene and polypropylene).

As used herein "consisting essentially of" is not intended to exclude the presence of minor amounts of materials not specifically set forth which do not significantly alter the azeotropic characteristic of the recited azeotrope.

EXAMPLE 1

Aerosol room fresheners were prepared with 1-chloro-1,2,2,2-tetrafluoroethane/n-butane (86.4/13.6 by weight) and 1-chloro-1,1-difluoroethane 142b/n-butane (78.9/21.1 by weight). The formulations and vapor pressures are reported in Table III.

TABLE III

| AEROSOL ROOM FRESHENER FORMULATIONS | | |
|---|---|---|
| Ingredient | Run A wt. % | Run B wt. % |
| Perfume | 2.0 | 2.0 |
| HCFC-124/n-butane (86.4/13.6) | 98.0 | — |
| HCFC-142b/n-butane (78.9/21.1) | — | 98.0 |
| Vapor Pressure at 70° F., psig (kPa) | 41 (283) | 33 (228) |

EXAMPLE 2

The solubility of the HCFC-124/n-butane azeotrope and its components in polystyrene was determined by combining these blowing agents (about 50 g) and pieces of polystyrene (about 2.5 cm long, 0.5 cm wide and 0.5 cm thick) in a pressure bottle for about seven days at ambient temperature. On removal of the polystyrene from the bottles, gain in weight and gain in volume of the polystyrene indicates the presence of non-diffusing gas (HCFC-124). The data in Table IV clearly shows the greater solubility in polystyrene of the HCFC-124/n-butane azeotrope compared with HCFC-124 and n-butane by themselves.

TABLE IV

| BLOWING AGENT SOLUBILITY IN POLYSTYRENE | | |
|---|---|---|
| Blowing Agent | Gain in wt., % | Gain in vol., % |
| HCFC-124 | 0.18 | −0.14 |
| n-butane | −2.58 | $2.29 \times 18^2$ |
| HCFC-124/n-butane (86.4/13.6) | 8.25 | $5.84 \times 10^4$ |

We claim:

1. An azeotropic composition consisting essentially of a member of the group consisting of 84.6 to 88.2 weight percent 1-chloro-1,2,2,2tetrafluoroethane and 11.8 to 15.4 weight percent n-butane; 68.5 to 76.5 weight percent 1-chloro-1,2,2,2-tetrafluoroethane and 23.5 to 31.5 weight percent isobutane; 74.6 to 83.2 weight percent 1-chloro-1,1-difluoroethane and 16.8 to 25.4 weight percent n-butane; and 58.6 to 62.4 weight percent 1- chloro-1,1-difluoroethane and 37.6 to 41.4 weight percent isobutane.

2. A process for preparing aerosol formulations wherein the active ingredients are combined in an aerosol container with an azeotropic composition of claim 1, said azeotropic composition functioning as propellant.

3. An azeotropic composition of claim 1 consisting essentially of from 84.6 to 88.2 weight percent 1-chloro-1,2,2,2-tetrafluoroethane and 11.8 to 15.4 weight percent n-butane.

4. An azeotropic composition of claim 1 consisting essentially of from 68.5 to 76.5 weight percent 1-chloro-1,2,2,2-tetrafluoroethane and 23.5 to 31.5 weight percent isobutane.

5. An azeotropic composition of claim 1 consisting essentially of from 74.6 to 83.2 weight percent 1-chloro-1,1-difluoroethane and 16.8 to 25.4 weight percent n-butane.

6. An azeotropic composition of claim 1 consisting essentially of from 58.6 to 62.4 weight percent 1-chloro-1,1-difluoroethane and 37.6 to 41.4 weight percent isobutane.

7. An azeotropic composition of claim 1 consisting essentially of about 86.4 weight percent 1-chloro-1,2,2,2-tetrafluoroethane and about 13.6 weight percent n-butane.

8. An azeotropic composition of claim 1 consisting essentially of about 72.5 weight percent 1-chloro-1,2,2,2-tetrafluoroethane and about 27.5 weight percent isobutane.

9. An azeotropic composition of claim 1 consisting essentially of about 78.9 weight percent 1-chloro-1,1-difluoroethane and about 21.1 weight percent n-butane.

10. An azeotropic composition of claim 1 consisting essentially of about 60.5 weight percent 1-chloro-1,1-difluoroethane and about 39.5 weight percent isobutane.

* * * * *